United States Patent [19]

Sibley et al.

[11] Patent Number: 4,887,376

[45] Date of Patent: Dec. 19, 1989

[54] ARTIFICIAL LURE WITH TIME RELEASE ATTRACTANT

[76] Inventors: Kenneth R. Sibley, 2408 Benton St., Akron, Ohio 44312; Gregory S. Bambeck, Box 7541, Canton, Ohio 44705

[21] Appl. No.: 214,855

[22] Filed: Jul. 5, 1988

Related U.S. Application Data

[63] Continuation of Ser. No. 46,924, May 7, 1987, abandoned.

[51] Int. Cl.$^4$ .................... A01K 85/00; A23L 1/325
[52] U.S. Cl. .................... 43/42.06; 43/42.24; 426/1
[58] Field of Search ............. 43/44.99, 42.06, 42.24; 426/1

[56] References Cited

U.S. PATENT DOCUMENTS

| | | | |
|---|---|---|---|
| 2,774,174 | 12/1956 | Ganger | 43/44.99 |
| 2,874,048 | 2/1959 | Walldov | 43/44.99 X |
| 3,220,960 | 11/1965 | Wichterle | 239/54 X |
| 3,684,519 | 8/1972 | Combs | 426/1 |
| 4,206,236 | 6/1980 | Orth, Jr. | 426/1 |
| 4,245,420 | 1/1981 | Carr | 43/42.06 |
| 4,463,018 | 7/1984 | Carr | 43/42.06 |
| 4,530,179 | 7/1985 | Larew | 43/42.24 |
| 4,550,521 | 11/1985 | Hayden | 43/44.99 |
| 4,576,821 | 3/1986 | Smith et al. | 43/44.99 X |
| 4,589,223 | 5/1986 | Hastings | 43/42.24 |
| 4,666,717 | 5/1987 | Smith et al. | 43/44.99 |
| 4,741,904 | 5/1988 | Smith et al. | 43/44.99 |
| 4,764,383 | 8/1988 | Brown et al. | 426/1 |

OTHER PUBLICATIONS

Irwin, "Hydron", Popular Science, vol. 194, #2, Feb. 1969, pp. 92–95.

*Primary Examiner*—Nicholas P. Godici
*Assistant Examiner*—Carmine Cuda
*Attorney, Agent, or Firm*—Oldham & Oldham

[57] ABSTRACT

This invention supplies lures whose polymer being applied to fish attractants and release said attractant into water at an essentially a controlled rate usually for a period sufficient for the attractant fish to arrive at the lure. These polymers may be any that are commercially available or known that has the ability to selectively absorb the lure and then release it controlably into water. The preferred polymers are copolymers of acrylic water swellable polyesters, water swellable polyesthers, water swellable poly urethanes, with the degree of water swellability being controlled by the degree of cross-linking.

9 Claims, No Drawings

ARTIFICIAL LURE WITH TIME RELEASE ATTRACTANT

This is a continuation of application Ser. No. 046,942, filed May 7, 1987, now abandoned.

TECHNICAL FIELD

This invention relates to fishing lures that exhibit certain bionic aspects. More particularly, it relates to a lure composed of a shaped polymer containing an essence that is accepted to fish or an attractant that will diffuse more readily from said polymer into water to develop an effective attractant or essence concentration in the water, preferably over a controlled time.

BACKGROUND ART

Sport fishing is the most popular of all recreational activities in first world nations and represents a multibillion dollar annual investment in equipment baits and tackle and other expenses of getting to and from the water. From time immemorial, tremendous creative human ingenuity has been applied to the creation of baits and lures. This quest for the "ultimate bait" has recently been elevated from a cottage industry to a true scientific discipline as man's understanding of game fish behavior has become more refined.

Until recently, synthetic baits were designed primarily to attract fish through an appeal to a fish's visual system. Primitive synthetic baits were merely visual analogues of live bait, giving only the visual appearance of the "real thing" that free living fish normally fed upon. From these observations, newer more modern baits were designed to optimize visual attraction and baits were designed which began to look very unlike the "real thing" viz. rubber worms and related baits. For instance, it was discovered that fish would respond more strongly to unnatural colors, shapes and motions than they would to their natural food source. The discovery that the lateral line nervous receptor system detects vibrations in water that indicate an injured potential food source causing a fish to orientate in the direction of the source of vibration has resulted in wriggle and rattle lures. Also, it has been shown that fish are strongly attracted to flashes of light, luminescence, flourescent true colors, transparent colors, spectral gratings and highly reflective colored surfaces, hereinafter sometimes referred to collectively as opticals or optical attractants. The highly successful Norman lures are designed to maximize all of the above mentioned features.

With the development of modern soft plastics and silicone rubbers, textural cues have been added to the list of sensemodality attraction. The logic, here, is that if it looks good and moves properly through the water, and the bait has the proper textural feel to it when the fish tests it, the fish strikes. The so called "rubber" baits, however, are hydrophobic and do not get slippery in water, which is thought to limit the efficacy of their textural context.

The most modern developments in fish bait and lure design deals with the sense modalities of olfaction and taste. It is now known that fish have exquisite olfactory and gustatory systems. Even sight based predator fish such as walleye are thought to have olfactory systems more sensitive than a blood hound while scent feeding fish such as catfish, carp and suckers are thought to have olfactory systems thousands of times more acute than the most discerning mammal. Attraction vs. avoidance behaviors in fish is strongly influenced by olfactory cues, and as evidenced in both salt and fresh water systems, may be the primary dominant cue in the initiation and sustenance of the so called "feeding frenzy". At the present time the olfactory attractant industry is quite young, but is rapidly growing because sports fisherman observe empirical proof of the power of scent attractants to catch fish. Unfortunately, no effective controlled time release and dose controlled system for olfactory attractants has been developed. Thus, the effectiveness of a scented bait in the water is extremely short lived. Oftentimes, by the time the fish have arived in the vicinity of the bait, the bait itself is exhausted. Thus, the fisherman is relegated to the annoying task of removing the bait from the water every few minutes and freshening it with another dollop of scent.

Efforts to alleviate this problem have thus far been embarrasingly primitive. The use of fibrous plastic networks and sponge-like devices not only fail to extend to effective functional life of scent attractant lures, but they also fail to attract fish on the basis of their other sense modalities.

DISCLOSURE OF INVENTION

We make a more perfect lure that provides appeal for he feeding senses of the fish; such as vision, vibrational motion, texture, smell and taste. From heuristic sense and empirical evidence, the better lure meets all these sensory factors the more satisfactory it is for the fisherman. The lures of this invention in its specific features comprises a polymer, preferably one that is hygroscopic, that will allow an attractant to diffuse therefrom into water to establish an effective concentrtaion of said attractant in the water for a control time, usually one to 24 hours. Thee polymer may be shaped by casting or molding or shaped in any of the ways polymers are shaped, such as formed into a film and rolled into shape of a worm and heat tacked to give the roll integrity. Generally, it is desirable to incorporate into the polymer the attractants prior to its being shaped. The attractants are usually added to the solution of the polymer, viz. after the cross-linking reaction simply by mixing or stirring in the attractant or attractants. Of course, any of the techniques used for mixing ingredients in polymers maybe used to mix in the attractant provided the mixing condition does not destroy the attractant.

In an alternate embodiment the normal lures may have holes of suitable sized bored therein and the holes may be plugged with the above polymer containing attractant incorporated therein. Of course, it should be appreciated that grooves or channels can be provided in the conventional lure and be filled with the polymer. This way the attractant can diffuse from the polymer to give an effective concentration of the attractant in the water.

The polymers useful in this invention are those well known to the polymer industry which exhibit the property of being able to accept a concentration of the attractant sufficient to be able to release preferentially in water a concentration of attractant to attract fish over a reasonable time. The time should at least be sufficient for the fish to arrive in the vicinity of the bait and accept it. Usually this time is from a few minutes to hours, with the preferred time being from about one to about 24 hours.

As indicated above the polymers are well known but those that have the ability to absorb water to swell the polymer or render the surface hygroscopic rather than hydrophobic like the commercial rubber worms made of silicone rubber or related rubbers are the more desirabe. Generally, the well known polypropylenepolyols are not highly water soluble but the lower molecular weight ones may exhibit some water swellability but its copolymer with ethylene polyol may be almost water soluble and slightly to highly water swellable. On the other hand, the polyethyene ether polyols, such as the polythylene ether glycols, available as carbowaxes from Union Carbide is completely water soluble or nearly so but it can be cross-linked with the well known poly isocyanates such as toluene diisocyanates to form polymers having the controlled water swellability and the ability to hold the attractant and give a more desirable time release of the attractant in water.

Another well known type of water soluble polymer is the ones used to make printing plates such as polythyleneetherepolyols reacted with polyisocyanate to form a prepolymer and then reacted with the hydroxyacrylates or methacrylates to give an oriented polyurethane or they may be all mixed together to give an unoriented polyurethane. The water solubility and water swellability can be controlled by use of more polyisocyanate or other crosslinkers or use of sufficient water insoluble polyols such as the well known hydrocarbon polyols, the proplylene ether glycols and the higher polyalkyl ether polyols of the elike with the polyethylene ether polyols to give a copolymer that has the desired degree of water swellability.

In fact, there are numerous water swellable polymers useful in this invention which the polymer chemist will know how to make that may be used in this invention. Polymers that are readily made and particularly preferred in this invention are the selected cross-linked polyacrylamides and polymethacrylamides and the agarose gel polymers. These base polymers are readily available or made for they are widely used in medical research, biotechnology and genetic engineering laboratories. These base polymers are principally employed to make macromolecular seive gels which are composed mostly of water in a matrix of polymer for use to separate genetic marcomolecules.

We have discovered these base polymers can be cross-linked to give a cross-linked polymer having a rate of diffusion that makes these polymers highly desirable to make fishing lures with the ability to give an effective attractant concentration in the water over a desirable use period. The desirable use period may be as short as a few minutes to an hour or more, viz. 24 hours to several days, as where the lure is used on a set line such as a trout line. The controlled cross-linking can give a control on the pore size in the polymer which are sufficient to pass macromolecules that gives the scents, odors, tastes and colors viz. dyes which maybe water soluble or nearly water insoluble. It should be noted that the gel formulations useful for biomedical applications are frequently far too brittle and fragile for fishing lures, therefore, we have developed new polymers that have better tensile strength and elasticity than the biomedical materials. And even better, in some cases than the conventional "rubber worms". The nature of these preferred polymers will be further described, together with the best modes thereof and thus illuminating this invention by the following illustrative and representative examples where the parts and percent is by weight unless otherwise indicated.

A wide range of monomers and cross-linkers can be used to make the copolymers preferred in this invention. These monomers have the formula HC=C—C—NH where R is hydrogen or hydrocarbon radical preferrably the alkyl radical methy although it may contain from 2, 3, 4, 5, 6 or higher carbon-atoms per radical. The preferred cross-linkers are N, N-methylene bis acrylamides or methacrylamide; N, N-dihydroxy ethylene bis acrylamide or methacrylamide, sometimes called Ho-Bis; bis acrylcyl cystamine, sometimes called cis-bis, and acrylaide, sometimes called aide. These specific monomers and these specific cross-linkers are desired as they have been found to yield a copolymer having a pore size readily adopted to the conventional attractants to permit their controlled diffusion into water as well as being hygroscopic in water.

EXAMPLE 1

A typical copolymer cross-linking controlled pore size production technique to yield the desired gel or seive gel is as follows:

From 5% to 50% monomer and from 0.001% tto about 0.3% cross-linker is placed in water, preferrably distilled water, to give a water concentration over the range of about 50 to 95%.

This mixture may be polymerized with any of the well known free radical catalysts and/or initiators such as the redox type useful for polymerization. A preferred one is abot 0.0025 to 0.001 parts of ammonium peroxy disulfate and about .0002 to 0.001 parts of tetrathylene methylene diamine at room temperature to elevated temperature. It is preferred to use sufficient catalyst and/or initiator to achieve the polymerization in about 5 minutes although those of ordinary skill in making these polymers appreciate that all these variables may be varied. These copolymers usually have an elongation 5 to 10 times the original length of the original test specimen, and a soft flesh like feel when soaked in water. Another type of catalyst system is riboflovin monophosphate initiated by ultraviolet light usually about 6 parts per 1000 parts of the catalyst and initiator are desired.

It should be noted that the elasticity of the above copolymer can be varied over a wide range by varying the ratio of monomer to cross-linker. The maximum to highly useful elasticity range, i.e. about 500 to 1000% is obtainable over ratios of 300:1 to 1500:1, when the ratios are lower than these the gels are brittle and higher ratios give gels that lengthen but loose their ability to return to their original shape except for the gels made with acrylaide which remain elastic when the monomer-crosslinker ratio is as low as 30:1.

Tensile strength is a function of two interacting variables. The first variable is the ratio of monomer to cross linker and is identical to the elasticity monomer to cross-linker maximum curve. However, tensile strength also increases with increasing percent of acrylamide. Thus a formulation at maximum monomer to cross linker elasticity ratio has its greatest tensile strength when total percent solids approaches 50% with our preferred polymer system.

However, a 50% total solids acrylamide polymer with maximum elasticity monomer to cross-linker ratio has a small pore size usually 0.0003 to 0.001 microns, the gel bloats up to 500% its normal size when immersed in water for 24 hours and has a 48 hour time frame for diffusion of one half its dissolved or attractant content. A range of 10% to 30% total solids provided half concentration diffusion rates ranging between one hour and 24 hours while minimizing water absorption expansion and maintaining an elasticity and tensile strength comparable to or greater than that of the so called "rubber worms".

In all experiments, diffusion rate was determined by spectrophotometric analysis of dyes which had been cast into the gels. Elasticity was measured by fixing one end of the shaped gel to a clamp and hanging progressively more weight on the other end of the shaped gel until it broke. The weight at breakpoint gave the tensile strength in kg/unit cross-sectional surface area. All gel test specimens were 10 cm long by 1 cm diameter.

EXPERIMENT II

A number of multivariant experiments were run to test characteristics of diffusion, color, odor, shape and reflectance, optimum elasticity and tensile strength. The lures with the variables listed below employed in these tests. The following list provides the types and numbers of each variable tested.

| Variable | Type |
|---|---|
| Color, dyes* | Red, Green, Blue, Yellow |
| Flavor or Odor | Albumin, egg yolk, walleye attractant, crayfish extract |
| Shape | Worm, wiggle worm, crayfish, salamander |
| Reflectance | Gold glitter present, no glitter |

| Nature of Variable | Number of Variables |
|---|---|
| Color | 4 |
| Odor/Flavor | 6 |
| Shape | 4 |
| Reflectance | 2 |
| | 4 × 6 × 4 × 2 = 192 |

*The dyes were watersoluble or insouble dyes Analysis of the number of variables possible in these experiments.

Thus a total of 192 individual variations of bait were produced. The odor flavor used was as follows:

Walleye attractant obtained from Berkely Bait Inc., albumin and yolk were obtained from chicken eggs, and earthworm, and crayfish extract were obtained by homogenization in a Warren blender followed by differential centrifugation with the lighter fluid fraction being used as the bait. Ratio of monomer to cross-linker was 1,250:1 and percent total solids was 20%. Shapes were obtained by casting the gel into readily obtained retail molds or from molds produced from casts of baits in fiberglass resin to give a bait of the shape listed above. Glitter was either added or omitted from the bulk pot mixture prior to casting and then mixed into the mixture to give a polymer containing the glitter.

These lures have a one half concentration diffusion time of about four hours and their volume only increases about 25% during this priod of time. Over a 24 hour period all diffusable molecules have been removed from the gel under favorable water temperature conditions for these experiments.

Many of the baits were tested in local lakes and streams in Ohio during the late summer. Even though this is generally considered to be the worst time of the fishing season for this area, fish were caught by a wide range of the above types of our synthetic bait. Unfortunately, such a large array of baits will need thousands of hours of field research against conventional baits before numbers large enough for statistical analysis can be generated. We were impressed with the unusual persistance with which fish pursued the bait. Another unusual observation was the large percentage of fish caught with the hook buried in their gullet. With live baits or conventional lures less than about 10% of fish caught have "swallowed the hook" while with our synthetic bait almost the converse was true. We find these signs to be a bit more than just encouraging as they indicated thaat once fish contact our multi-sensory mode bait, they appear to be going into an irreversible feeding reflex.

EXPERIMENT III

Maximum elasticity and maximum tensile strength acrylamide monomer to crosslinker ratio copolymers (as previously described in experiments I & II) were cast with inclusions, the inclusions being leaders, hooks, metal flake, plastic glitter, rattles, spectral gratings, treble hook. lattices and fibrous matrix shape integrity stabilizers. These lures were then subjected to destructive testing via casting and trolling. These inclusion lures could be cast hundreds of times or trolled for many hours without any apparent damage. These tests indicated our polymers could be used to duplicate any of the usual bait shapes and features.

EXPERIMENT IV

This experiment is like experiment III except that it is essentially experiment III in reverse. In this experiment, rigid commercial lures were used as the primary lure while the acrylamide copolymer was used as the inclusion within the lure. These rigid lures were drilled or routed and the resultant hole or channel was plugged with our acrylamide copolymer containing the attractant. These lures were tested by the casting and trolling techniques described in experiment III. The formulations tested gave successful catches.

Finally, we cut up acrylamide copolymer into small pieces and the pieces were packed into wax lure molds. Then epoxide resins were poured into the mold. This resulted in a rigid lure in which the acrylamide copolymer was the matrix. The surface of this epoxy lure was polished to expose the acrylamidecopolymer in places to the enviromnent. It was not necessary to use our highly elastic formulation when casting the copolymer as an inclusion within a rigid lure as the commercially available brittle polyacrylamides performed excellently.

We performed a number of experiments with acrylamide to cross-liner ratios lower than 300:1 and employed them as inclusions in rigid lures to get effective diffusion of the attractant into the water.

In all of the experiments mentioned in experiment IV, control pore size could be produced by design and thus, diffusion rate could be produced on demand.

While in accordance with the patent statutes only the best mode and preferred embodiment of the invention has been illustrated and described in detail, it is to be understood tht the invention is not limited thereto or thereby, but that the scope of the invention is defined by the appended claims:

What is claimed is:

1. An artificial lure of a shaped polymer containing an attractant that will distribute preferentially in water from said polymer to give an effective time release of the attractant, said polymer being a crosslinked acrylic, said cross-linked acrylic being selected from the class of acrylamide and methacrylamides with a cross linker selected from the class consisting of N-N-methylene-bis-acrylamides or methacrylamide, N,N-dihydroxy ethylene bis acrylamide or methacrylamide, bis acrylcyl cystamine, and acrylaide, and the ratio of acrylamide or methacrylamide to said cross-linker being 300:1 to 1500:1.

2. The artificial lure of claim 1 wherein the polymer is crosslinked with acrylaide, 3. The artifical lure of claim 1 wherein the polymer is acrylamide or methacrylamide cross-linked with bis-acrylcyl cystamine or acrylaide.

4. The lure of claim 1 wherein the polymer accepts water to exhibit a hygroscopic surface.

5. The lure of claim 1 wherein the polymer is porous with pore size macromolecular in dimension to absorb the attractant from a high concentration of attractant to saturate said polymer and allow controlled release of the attractant into water.

6. The lure of claim 5 wherein the polymer contains pores from 0.0005 to 0.1 microns in diameter.

7. The lure of claim 1 wherein the polymer has palpable flesh like elastic consistancy and a hygroscopic slippery surface.

8. The lure of claim 1 wherein the attractant is composed multiple sensory modality attractant including odors, flavors and color.

9. The lure of claim 1 wherein the polymer includes in addition to attractants, inclusions.

* * * * *